United States Patent [19]
Meier et al.

[11] Patent Number: 6,099,683
[45] Date of Patent: Aug. 8, 2000

[54] PROCESS FOR THE PRODUCTION OF A COMPOSITE SHEET

[75] Inventors: Johannes Meier, Neuhausen; Urs Gabi, Würenlos, both of Switzerland

[73] Assignee: Alusuisse Technology & Management Ltd., Switzerland

[21] Appl. No.: 08/339,637

[22] Filed: Nov. 14, 1994

Related U.S. Application Data

[63] Continuation of application No. 07/920,881, Jul. 28, 1992, abandoned.

[30] Foreign Application Priority Data

Aug. 5, 1991 [SE] Sweden ..................................... 2314/91

[51] Int. Cl.[7] ..................................................... B32B 31/00
[52] U.S. Cl. ......................... 156/292; 156/290; 428/116; 428/118; 428/188
[58] Field of Search .................................. 156/292, 290, 156/276; 181/288, 290, 291, 292; 428/116, 118, 188

[56] References Cited

U.S. PATENT DOCUMENTS

| | | | |
|---|---|---|---|
| 3,656,992 | 4/1972 | Lynam et al. | 156/197 X |
| 3,707,583 | 12/1972 | McKown | 428/118 X |
| 3,732,138 | 5/1973 | Almog . | |
| 4,155,800 | 5/1979 | Wilson | 156/499 |
| 4,249,974 | 2/1981 | Wilson | 156/252 |
| 4,249,976 | 2/1981 | Hudson | 428/116 X |
| 4,294,055 | 10/1981 | Andersen | 52/795 |
| 4,420,359 | 12/1983 | Goldsworthy | 156/583.5 X |
| 4,496,024 | 1/1985 | Wolf et al. | 181/292 |
| 4,504,346 | 3/1985 | Newsam | 156/290 |
| 4,641,726 | 2/1987 | Fearon et al. | 156/290 X |
| 4,859,517 | 8/1989 | Hull | 156/292 X |
| 4,886,563 | 12/1989 | Bennett et al. | 156/292 |
| 4,902,365 | 2/1990 | Westlake, Sr. | 428/118 X |
| 4,990,201 | 2/1991 | Trnka | 156/285 |
| 4,990,391 | 2/1991 | Veta et al. | 156/292 |
| 5,022,943 | 6/1991 | Zaima | 428/116 X |
| 5,037,498 | 8/1991 | Umeda | 156/307.3 |
| 5,160,248 | 11/1992 | Clarke | 156/292 |
| 5,316,604 | 5/1994 | Fell | 428/116 X |

FOREIGN PATENT DOCUMENTS

| | | | |
|---|---|---|---|
| 0075033 | 3/1983 | European Pat. Off. . | |
| 0288843 | 11/1988 | European Pat. Off. . | |
| 2096535 | 10/1982 | United Kingdom . | |
| 2104839 | 3/1983 | United Kingdom . | |
| 9014943 | 12/1990 | WIPO | 156/292 |
| 9210362 | 6/1992 | WIPO | 156/292 |

*Primary Examiner*—Jeff H. Aftergut
*Attorney, Agent, or Firm*—Bachman & LaPointe, P.C.

[57] ABSTRACT

Process for the production of a composite sheet (90) comprising a cellular core (41) and at least one outer layer (42) by bonding the outer layer (42) to the cellular core (41), for example with the aid of an adhesive film (84) under pressure and at elevated temperature, where the adhesive film (84) may initially extend over the entire surface and breaks up in the region of the honeycomb interior under the action of heat and on exposure to a gaseous medium, concentrating at the points of contact between the cellular core (41) and the outer layer (42). The outer layer (42) itself has an adhesive layer or an adhesive film (83) on the side facing the cellular core. The outer layer bonds to the cellular core under pressure and at elevated temperature.

10 Claims, 2 Drawing Sheets

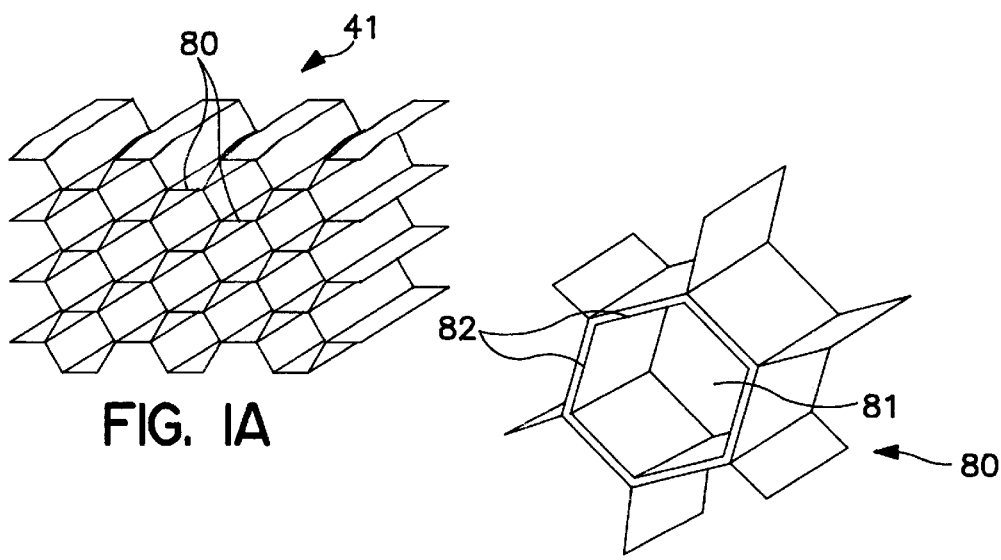
FIG. 1A
FIG. 1B
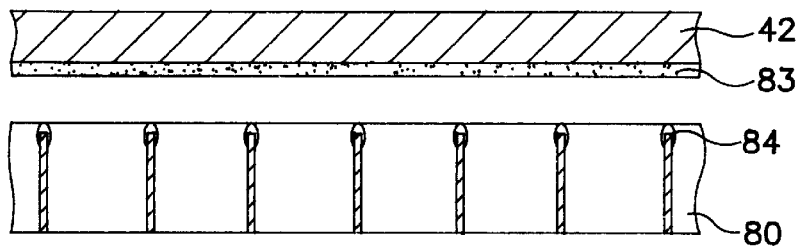
FIG. 2
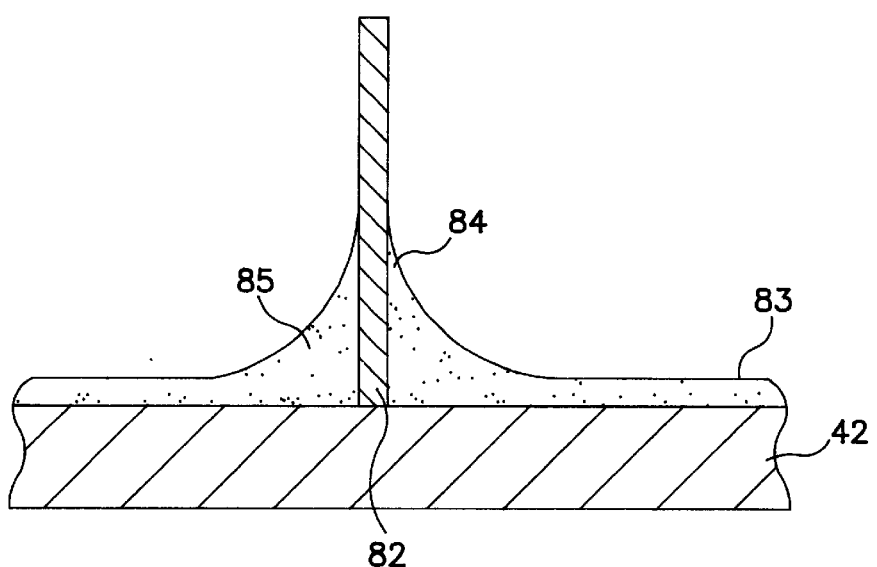
FIG. 3

PROCESS FOR THE PRODUCTION OF A COMPOSITE SHEET

This is a continuation of application Ser. No. 07/920,881 filed on Jul. 28, 1992, now abandoned.

BACKGROUND OF THE INVENTION

The invention relates to a process for the production of a composite sheet comprising a cellular core with at least one outer layer by bonding the outer layer to the cellular core with the aid of adhesive, adhesive where applied to the cellular core, and the outer layer is subsequently applied and bonded to the cellular core under pressure and at elevated temperature. The invention also relates to the composite sheets produced by the process, and to their use.

On bonding of cellular cores and outer layers, an adhesive can in principle only be effective at the points of contact between the cellular core and the outer layers. A significant disadvantage of adhesive processes is that the adhesive, applied over the entire surface, will not be located in increased amounts at the points of contact between the cellular core and the outer layer.

GB 2,096,535 A describes a process for bonding a honeycomb core to at least one perforated element in which an adhesive film is applied to the perforated element or to the honeycomb core.

The adhesive bonds disclosed hitherto between honeycomb cores and outer layers have not been able to satisfy all the demands made, for example with respect to delamination or separation strength of the layers. The object of the present invention is to overcome said disadvantages.

SUMMARY OF THE INVENTION

The object set is achieved according to the invention by a process in which the adhesive is located on the cellular core in the form of drops only on the faces of the cells, and in which the outer layer being fed onto the cellular core has, on the side facing the cellular core, an adhesive layer or an adhesive film.

An expedient process is for the production of the composite sheet in accordance with the present invention comprising a cellular core and at least one outer layer by bonding the outer layer to the cellular core with the aid of adhesive films, in which an adhesive film is placed on the cellular core, and the outer layer is subsequently applied and bonded to the cellular core under pressure and at elevated temperature, characterised in that the adhesive film, after being placed on the cellular core, is heated and exposed to a gaseous medium, and in that the outer layer being fed onto the cellular core has, on the side facing the cellular core, an adhesive layer or an adhesive film.

BRIEF DESCRIPTION OF THE DRAWINGS

Further details of the invention are revealed below by the illustrative, diagrammatic drawings, in which:

FIGS. 1a and 1b show perspective views of a section of a cellular core, as an example a honeycomb core and an individual honeycomb cell therefrom;

FIG. 2 shows a section through an outer layer with adhesive film and a honeycomb core with burst adhesive film;

FIG. 3 shows a section through a point of contact between the honeycomb core and the outer layer.

DETAILED DESCRIPTION OF PREFERRED EMBODIMENTS

Figure 4:
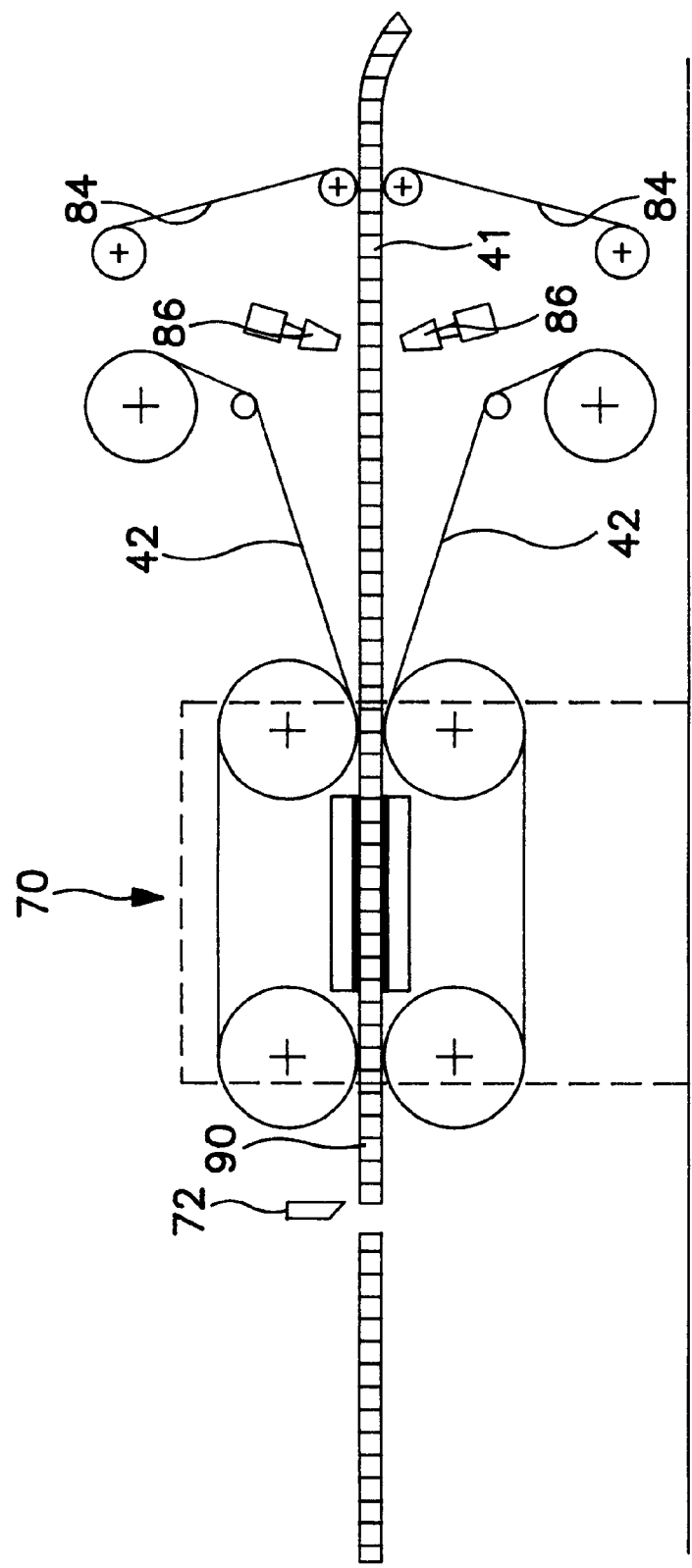
FIG. 4 shows the production of a composite sheet by means of a twin-belt press.

The process according to the invention can be carried out with outer layers made from various materials. Examples of suitable materials are plastics based on polyolefins, polyamides, acrylate-butadiene-styrene, phenol-formaldehyde resins, etc. The plastics may have been modified by means of fillers and/or reinforcing agents. Examples of fillers are pigments, such as $TiO_2$, and very finely divided substances may be, for example, from the series comprising $Al_2O_3$ or $SiO_2$. Reinforcing agents or armoring substances may be fibers, woven fabrics, knitted fabrics or nonwovens made from glass, carbon, thermoplastics, aramid, Kevlar, SiC or SiN whiskers, or natural materials, such as jute, sisal, hemp, cotton, wool and the like.

Preferred outer layers are made from metals, for example from the series comprising iron, steel, zinc, zinc-plated iron, tin, bronze, non-ferrous metals, copper or particularly preferably aluminum or alloys thereof. The metals are used, in particular, as foils, tapes or sheets. The thickness of such outer layers is expediently in the range from 0.2 to 2.5 mm.

The cellular cores may be made, for example, from metals, such as those mentioned above, or from other materials, such as plastics, paper, cardboard or the like. These cellular cores are preferably made from aluminum or alloys thereof. The cellular cores preferably have a density of from 20 to 120 $kg/m^3$.

The cellular cores are, for example, bundles of individual cells. The individual cells may, in plan view, have a circular or polygonal, for example rectangular or hexagonal, cross-section. Correspondingly, the cores may, in plan view, have the shape of, for example, tube bundles or honeycombs. Preferred cellular cores are honeycombs having a hexagonal cross-section of an individual cell.

Suitable adhesives may be chemically or physically setting adhesives. Examples of physically setting adhesives are hot-melt, contact or solvent adhesives or glues which can set at high or low temperatures. Examples of chemically setting adhesives are 1- and 2-component adhesives, low- and high-temperature adhesives and reactive adhesives.

According to the present invention, the adhesive is used as such or as an adhesive film or as a film-form adhesive. Examples of adhesive films which can be used are foamed or foamable films. Of foamable films, adhesive films which can be expanded under the action of heat are particularly preferred. Further preferred adhesive films are foamed films having a am structure.

According to the present invention, thermoplastic adhesive films based on polyolefins, such as polyethylenes, are used in particular. The thickness of the adhesive layers and in particular of the adhesive films can be, for example, 50 to 500 $\mu$m.

The ratio between the thickness of the adhesive film placed on the cellular core and the adhesive layer or adhesive film applied to the outer layer is preferably, for example, from 1:0.01 to 1:20, expediently from 1:0.2 to 1:2. A preferred ratio is from 1:0.3 to 1:1, very particularly preferably from 1:0.4 to 1:0.5.

An expedient density of the adhesive films can be from 200 to 1500 $kg/m^3$ or, in the case of foamed adhesive films, the density can be from 20 to 1000 $kg/m^3$. Corresponding amounts of adhesive are then from 0.005 to 0.05 $g/cm^2$ or from 50 to 500 $g/m^2$. Amounts of from 150 to 250 $g/m^2$ are preferred. If the adhesive is used in coating or film form, suitable amounts, per side, are from 1 to 50 $g/m^2$.

After the adhesive film has been placed on the cellular core, the adhesive film is, according to the invention, heated and exposed to a gaseous medium. The heat can be applied, for example, by radiation and the exposure to the gaseous medium subsequently carried out by means of a jet. In general, the two processes are combined, expediently by means of a hot-air jet and nozzle arrangements.

The gaseous medium can be, for example, air, nitrogen, carbon dioxide, a noble gas or, if still permissible, a chlgrofluorocarbon, or mixtures of said gases. The gaseous medium is preferably air, which leaves the hot-air jet as hot air.

When carrying out the process according to the invention, the temperature of the gaseous medium generally depends on the type of adhesive and on its softening or melting range. For example, the hot air has a temperature in the range from 150 to 450° C. The speed of the gaseous medium can be, for example, 5 to 20 m/sec.

The bonding of the outer layers to the core is carried out under pressure and at elevated temperature. The pressure exerted onto the adhesive layer and the core via the outer layer can be, for example, from 0.1 to 1000 N/cm$^2$. In practice, preferred pressures of from 1 to 500 N/cm$^2$ and in particular from 10 to 150 N/cm$^2$ can be used. The pressure is generally applied mechanically onto the outer layers. This can take place by means of a press containing upper and lower dies, it being possible to generate the pressure mechanically, hydraulically or pneumatically. The temperature used depends substantially on the type of adhesive and can be, for example, from 50 to 400° C., a range from 100 to 200° C. being preferred.

Preference is given to continuous processes, and the outer layer or the outer layers can in particular be bonded to the cellular core in a twin-belt press.

FIG. 1a shows a cellular core 41 by means of the example of a honeycomb core having a hexagonal design of the honeycomb cells 80. An individual honeycomb cell 80 is shown in FIG. 1b. In the process according to the invention, the adhesive film 84 is first laid on the honeycomb core 41, in particular with as smooth a surface as possible. The fact that the adhesive film 84 covers the entire surface means that it also covers the interior 81 of the individual honeycomb cells 80. The faces 82 of the honeycomb cells 80 are in contact with the adhesive film 84. After the adhesive film 84 has been placed on the honeycomb core 41, it is heated and exposed to a gaseous medium. This procedure causes the adhesive film 84 to soften or melt and to remain adhering only to the faces 82 of the honeycomb cells 80. In the procedure, the adhesive film 84 bursts over the interior 81 of the honeycomb cells 80 and, due to the tension of the adhesive film 84 or the surface tension of the adhesive and/or to the flow of the gaseous medium, the adhesive withdraws from the interior 81 of the honeycomb cells 80 at the webs in the region of their faces 82. The consequence is that adhesive is only present at the faces 82; this occurs to a greater extent than could be effected by the film alone, unless a thicker film were to be used, which would result in increased material consumption and thus increased costs.

In FIG. 2, in the use according to the invention of two adhesive films 83, 84, an adhesive film 83 is applied to the surface of the outer layer 42 which faces the inside of the composite sheet 90, and the other adhesive film 84 is placed on the honeycomb core 41 and treated in the manner according to the invention, so that this adhesive film forms a network structure and surrounds the faces 82 of the honeycomb cells 80 in the form of drops. The two adhesive films 83, 84 are then brought into contact.

FIG. 3 shows a point of contact between the honeycomb core 41 and the outer layer 42, two adhesive films 83, 84 being used according to the invention. The formation by the adhesive film 84 of a drop structure at the faces 82 of the honeycomb cells 80 causes an increased adhesive contour 85 to form, whose adhesive effect is additionally reinforced by the adhesive film 83.

FIG. 4 shows the use of the process according to the invention for the production of a continuously produced composite sheet 90. First, the honeycomb core 41 is provided on both sides at the faces 82 of the honeycomb cells 80 with adhesive in the form of films 84. After the adhesive films 84 have been applied to the faces 82 of the honeycomb core 41, the adhesive films 84 are exposed to a hot gaseous medium, particularly hot air. This is carried out by means of the hot-air jets 86 arranged on both sides of the honeycomb core 41. This procedure causes the adhesive films 84 to soften or melt and the adhesive to only remain adhering to the faces 82 of the honeycomb cells 80. The outer layers 42 are then applied.

The outer layers 42 may have already been provided with the adhesive film 83, which is itself located between the outer layer 42 and the honeycomb core 41, on the corresponding side of the outer layer 42. In this case, the outer layer 42 and the adhesive film 83 can form a laminate, which can be present, for example, in roll form and can be fed continuously to the process for the production of composite sheets. The outer layers 42 and the adhesive films 83 can also be provided on separate storage rolls and combined to form a laminate immediately before the production of composite sheets.

If an adhesive layer is to be applied to the outer layer, the adhesive can be used as such, or in dissolved, suspended or dispersed form in a solvent or carrier medium, and can be applied to one side of the outer layer by brushing, knife coating, spraying, etc.

The sandwich comprising the honeycomb core 41 with adhesive arranged in a network structure on both sides and, arranged on top of the adhesive, outer layers 42 provided with adhesive films and being, for example, aluminum, outer layers, is fed, for example, to a continuous press 70, where it is bonded to form a composite sheet 90. The composite sheet 90 produced continuously in this way can be cut into lengths as desired in a manner known per se by means of a cutting device 72.

The present invention also relates to composite sheets produced by the process according to the invention or by its expedient or preferred embodiments.

The composite sheets which can be produced by the process according to the invention can be used, for example, as flooring boards, side planking, ceiling boards, partition walls, etc., in means of transport, such as buses, railway carriages and aircraft, or on large storage vessels, such as containers, airfreight containers and the like, or as flooring, wall or ceiling boards in or on buildings. The composite sheets according to the invention may in addition be used for furniture, parts of furniture, interior fittings, parts of interior fittings, sports articles or parts of sports articles.

EXAMPLE 1

Two outer layers of aluminum having a thickness of 0.5 mm are coated on one side with an adhesive film based on polyolefins. The amount of adhesive is in each case about 100 g/m$^2$ per treated side of the outer layer. A honeycomb core of aluminum having a hexagonal cell cross-section and a density of about 80 kg/m$^3$ is coated, on each side of the honeycomb core, with about 100 g/m² of adhesive in film form. To this end, the adhesive films are placed with a smooth surface on both sides of the adhesive core and then exposed to air at a temperature of about 250° C. by means of a hot-air jet. The speed of the hot-air stream here is about 8 m/sec. During the treatment, the adhesive film melts and only remains adhering to the faces of the honeycomb cells. Immediately subsequently, the outer layers, with the adhesive film facing the honeycomb core, are brought into contact, on both sides of the honeycomb core, with the adhesive-coated faces of the honeycomb core in a belt press. The two outer layers are subjected to a pressure of about 80 N/cm² and pressed against the honeycomb core. In the belt press, the continuously produced composite follows a temperature profile with a heating and subsequent cooling zone. The composite a) is thus produced.

EXAMPLE 2, COMPARATIVE EXPERIMENTS

The above-described experimental procedure is repeated, with the exception that the outer layers are not covered with adhesive films. However, the total amount of adhesive remains the same, i.e. each coated side carries twice the amount of adhesive compared with the previous experiment. Adhesive is only present at the two faces of the honeycomb core. A composite b) is produced.

The experimental procedure is repeated again, with the exception that adhesive films are applied only to the two outer layers on one side in each case, while no adhesive films are applied to the honeycomb core. However, the total amount of adhesive remains the same, i.e. each coated side carries twice the amount of adhesive compared with the first experiment. Adhesive is only present at the two inner surfaces of the outer layers. A composite c) is produced.

EXAMPLE 3

The composites a), b) and c) are tested in order to determine the peel moment in accordance with DIN 53 295. During the test, the outer layers are separated mechanically from the honeycomb core, and the forces necessary for this are measured. If the force for separation of the outer layer from the honeycomb core in composite c) is set at 100%, the force for composite b) is 300% and for the composite a) produced according to the invention is 600%.

What is claimed is:

1. Process for the production of a composite sheet, which comprises:
   applying a thermoplastic adhesive to a cellular core having a plurality of cell faces;
   locating the thermoplastic adhesive on the cellular core in the form of drops only on the cell faces;
   providing an outer layer;
   providing thermoplastic adhesive on the outer layer on the side thereof facing the cell faces of the cellular cores;
   feeding the outer layer with said thermoplastic adhesive thereon onto the cell faces of the cellular core; and
   bonding said outer layer with said thermoplastic adhesive layer thereon to the cell faces of the cellular core under pressure and at elevated temperature, said bonding step comprising mating said outer layer to said cell faces of said cellular core so that the cellular core thermoplastic adhesive and the outer layer thermoplastic adhesive contact each other.

2. Process according to claim 1 wherein the adhesive on the outer layer is a foamed or foamable film.

3. Process according to claim 2 wherein the adhesive on the cellular core and on the outer layer is a foamed film having a closed-cell structure.

4. Process according to claim 1 wherein the bonding of the outer layer to the cellular core is by a pressing operation which takes place at a temperature of from 50–400° C.

5. Process according to claim 4 wherein said pressing operation takes place at a temperature of from 100–200° C.

6. Process according to claim 4 wherein the bonding of the outer layer to the cellular core takes place in a twin-belt press.

7. Process for the production of a composite sheet, which comprises:
   providing a cellular core having a plurality of cell faces;
   applying a thermoplastic adhesive selected from the group consisting of polyolefins to said cell faces of said cellular core;
   heating said thermoplastic adhesive and exposing it to a gaseous medium after said thermoplastic adhesive is applied to said cell faces so as to form a network structure of adhesive surrounding said cell faces;
   providing an outer layer;
   providing a thermoplastic adhesive on the outer layer on a side thereof facing the cellular core;
   feeding the outer layer with said thermoplastic adhesive thereon onto the cell faces of the cellular core;
   bonding said outer layer to the cell faces and the cellular core using a pressing operation which takes place at a temperature of from 50 to 400° C.;
   wherein said bonding step comprising mating the outer layer to said cellular core by mating the network structure of adhesive and the outer layer thermoplastic adhesive.

8. Process according to claim 7 wherein the gaseous medium is air, and the temperature of the air is from 150° C. to 450° C.

9. Process according to claim 8 wherein said exposure to gaseous medium takes place through at least one heatable jet.

10. Process according to claim 7 wherein said exposure to a gaseous medium causes the adhesive applied to the cell faces to soften or melt and to remain adhered to the cell faces.

* * * * *